United States Patent [19]

Shimura

[11] Patent Number: 4,887,305
[45] Date of Patent: Dec. 12, 1989

[54] METHOD OF ADJUSTING READ-OUT CONDITIONS FOR RADIATION IMAGE

[75] Inventor: Kazuo Shimura, Kanagawa, Japan

[73] Assignee: Fuji Photo Film Co., Ltd., Kanagawa, Japan

[21] Appl. No.: 169,703

[22] Filed: Mar. 18, 1988

[30] Foreign Application Priority Data

Mar. 20, 1987 [JP]  Japan ................................. 62-67302

[51] Int. Cl.$^4$ .......................... G03C 5/16; G03B 6/00; G06K 9/38
[52] U.S. Cl. .......................................... 382/51; 382/6; 382/18; 382/39
[58] Field of Search .............................. 358/111, 199; 250/327.2; 382/6, 18, 51, 52, 53, 54, 39

[56] References Cited

U.S. PATENT DOCUMENTS

| 4,258,264 | 3/1981 | Kotera et al. | |
| 4,302,672 | 11/1981 | Kato | 382/6 |
| 4,527,060 | 7/1985 | Suzuki | 250/327.2 E |
| 4,571,635 | 2/1986 | Mahmoodi | 382/54 |
| 4,637,054 | 1/1987 | Hashim | 382/18 |
| 4,682,028 | 7/1987 | Tanaka | 250/327.2 G |

FOREIGN PATENT DOCUMENTS

| 0170270 | 2/1986 | European Pat. Off. | 250/327.2 |
| 0080474 | 4/1986 | Japan | 382/18 |

Primary Examiner—Reinhard J. Eisenzopf
Assistant Examiner—Jose M. Solis
Attorney, Agent, or Firm—Sughrue, Mion, Zinn, Macpeak & Seas

[57] ABSTRACT

A method of adjusting read-out processing conditions for a radiation image comprises the steps of calculating the maximum image signal level Smax and the minimum image signal level Smin of a desired image information range from image signals for condition adjustment which represent a radiation image, and adjusting the read-out processing conditions on the basis of the maximum image signal level Smax and the minimum image signal level Smin thus calculated. At least one of the maximum image signal level Smax and the minimum image signal level Smin is determined on the basis of a difference histogram of the image signals for condition adjustment.

7 Claims, 2 Drawing Sheets

METHOD OF ADJUSTING READ-OUT CONDITIONS FOR RADIATION IMAGE

BACKGROUND OF THE INVENTION

1. Field of the Invention

This invention relates to a method of adjusting read-out processing conditions, i.e. read-out conditions for final read-out and/or image processing conditions, for a radiation image.

2. Description of the Prior Art

When certain kinds of phosphors are exposed to a radiation such as X-rays α-rays, 62 -rays, γ-rays cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon. Then, final read-out is carried out by exposing the stimulable phosphor sheet carrying the radiation image stored thereon to stimulating rays such as a laser beam which cause the stimulable phosphor sheet to emit light in proportion to the stored radiation energy, and photoelectrically detecting the emitted light to obtain electric image signals for use in reproduction of a visible image. An image processing is carried out on the final read-out image signals obtained by the final read-out, and the radiation image of the object is reproduced as a visible image by use of the processed image signals on a recording medium such as a photographic film, a display device such as a cathode ray tube (CRT), or the like.

In the aforesaid radiation image recording and reproducing system, the range of the level of the radiation energy stored on the stimulable phosphor sheet is caused to fluctuate among radiation images by changes in the object, the image recording portion thereof, radiation dose, or the like.

However, in the aforesaid radiation image recording and reproducing system, the recorded image information, particularly the range of the level of the radiation energy or the like, of each radiation image stored on the stimulable phosphor sheet may be ascertained in advance, and the final read-out may be carried out by use of read-out conditions such as a read-out gain and a scale factor adjusted to appropriate values in accordance with the recorded image information of each radiation image. In this case, for each radiation image, it becomes possible to obtain a visible image free from adverse effects of the fluctuation in the range of the level of the radiation energy stored on the stimulable phosphor sheet and suitable for viewing, particularly for diagnostic purposes, for example, a visible image wherein the necessary object image information is always expressed within the correct density range suitable for viewing, particularly for diagnostic purposes.

Also, in the aforesaid radiation image recording and reproducing system, the image processing of the final read-out image signals obtained by the final read-out is carried out by use of image processing conditions such as gradation processing conditions adjusted for each radiation image based on the image recording portion of the object such as the head, the chest or the abdomen, and/or the image recording method such as plain image recording or contrasted image recording so that a visible image suitable for viewing, particularly for diagnostic purposes, can be obtained. However, for example, in the case where the final read-out is carried out without using the read-out conditions adjusted to appropriate values in accordance with the recorded image information of each radiation image, the image processing conditions should preferably be adjusted by considering the recorded image information of each radiation image, which has been ascertained in advance, besides the image recording portion of the object and/or the image recording method. In this manner, it becomes possible to obtain a visible image suitable for viewing, particularly for diagnostic purposes, wherein the necessary object image information is expressed within the correct density range.

Ascertaining of the image information recorded on the stimulable phosphor sheet prior to the final read-out and the image processing may be carried out by use of the method as disclosed in Japanese Unexamined Patent Publication No. 58(1983)-67240. In the disclosed method, preliminary read-out for ascertaining the recorded image information of a radiation image stored on the stimulable phosphor sheet is carried out in advance by use of stimulating rays having stimulation energy of a level lower than the level of the stimulation energy of stimulating rays used in the final read-out for detecting the image signals for use in reproduction of a visible image for viewing, particularly for diagnostic purposes, and thereafter the final read-out is carried out. The read-out conditions for the final read-out and/or the image processing conditions are adjusted based on the recorded image information ascertained by the preliminary read-out, i.e. the preliminary read-out image signals obtained by the preliminary read-out.

In the case where only the image processing conditions are to be adjusted based on the recorded image information, it is only necessary that the recorded image information be ascertained prior to the image processing. In this case, since the final read-out image signals representing the recorded image information have already been detected, the image processing conditions can be adjusted based on the final read-out image signals, and the preliminary read-out as mentioned above need not necessarily be carried out.

On the other hand, as one of the methods for adjusting the read-out conditions for the final read-out and/or the image processing conditions on the basis of the aforesaid preliminary read-out image signals and/or the final read-out image signals used in the course of adjustment of the image processing conditions (both the preliminary read-out image signals and the final read-out image signals used in the course of adjustment of the image processing conditions will hereinbelow be generically referred to as the image signals for condition adjustment), it is considered to employ a method wherein the maximum image signal level Smax and the minimum image signal level Smin of a desired image information range in the image which the image signals for condition adjustment represent are calculated from the image signals for condition adjustment, and the read-out conditions for the final read-out and/or the image processing conditions are adjusted on the basis of Smax and Smin.

As the method of adjusting the read-out conditions for the final read-out on the basis of the image signals for condition adjustment, a novel method has been proposed in, for example, Japanese Unexamined Patent Publication No. 60(1985)-156055. The proposed method comprises the steps of: determining a histogram of the preliminary read-out image signals (image signal levels), calculating the maximum image signal level Smax and the minimum image signal level Smin of a desired image information range in the histogram, and adjusting the read-out conditions for the final read-out so that the maximum image signal level Smax and the minimum image signal level Smin correspond respectively to the maximum signal level Qmax and the minimum signal level Qmin of a desired input signal range in an image processing means which are determined by the maximum density Dmax and the minimum density Dmin of a correct density range in the reproduced visible image.

Also, as the method of adjusting the image processing conditions, for example, gradation processing conditions, on the basis of the image signals for condition adjustment, the method as mentioned above may be used by way of example. Specifically, there may be used a method comprising the steps of: determining a histogram of the image signals for condition adjustment (image signal levels), calculating the maximum image signal level Smax and the minimum image signal level Smin of a desired image information range in the histogram, and adjusting the gradation processing conditions so that the maximum image signal level Smax and the minimum image signal level Smin correspond respectively to the maximum signal level Rmax and the minimum signal level Rmin of a desired input signal range in an image reproduction means (visible image output means) which are determined by the maximum density Dmax and the minimum density Dmin of a correct density range in the reproduced visible image.

The term "read-out conditions" as used herein means various conditions affecting the relationship between the input to the read-out means and the output thereof, for example, the relationship between the input to the photoelectric read-out means (i.e. the amount of the light emitted by the stimulable phosphor sheet) and the output thereof (i.e. the level of the electric image signal) in the aforesaid case. For example, the term "read-out conditions" means the read-out gain (sensitivity) determining the relationship between the input and the output of the read-out means, the scale factor (latitude), and the power of the stimulating rays used for read-out.

The term "image processing conditions" as used herein means various conditions affecting the relationship between the input and output of an image processing means, for example, gradation processing conditions, frequency response processing conditions, or the like.

As mentioned above, the level of the stimulating rays used in the preliminary read-out is adjusted to be lower than the level of the stimulating rays used in the final read-out. That is, the effective energy of the stimulating rays which the stimulable phosphor sheet receives per unit area in the preliminary read-out is adjusted to be lower than the effective energy of the stimulating rays used in the final read-out.

However, it may occur that the image information which the preliminary read-out image signals and the final read-out image signals used as, by way of example, the aforesaid image signals for condition adjustment represent contains unnecessary image information besides the desired image information, and the maximum image signal level Smax and the minimum image signal level Smin of a desired image information range cannot be calculated accurately because of the presence of the unnecessary image information. In the case where Smax and Smin are incorrect, the read-out conditions for the final read-out and/or the image processing conditions adjusted based on Smax and Smin become incorrect, and consequently it is not always possible to obtain a visible reproduced image suitable for viewing, particularly for diagnostic purposes.

By way of example, the aforesaid problems arise in the case where image recording is carried out by limitation of the irradiation field. Specifically, in the case where the aforesaid radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in the aforesaid radiation image recording and reproducing system, the irradiation field is often limited in the course of recording of a radiation image. However, in the case where image recording is carried out by limitation of the irradiation field as mentioned above, radiation scattered by the object within the irradiation field normally passes outside of the irradiation field. The scattered radiation is absorbed and stored on the stimulable phosphor sheet which exhibits high sensitivity, and therefore the histogram of the image signals (image signal levels) obtained by the preliminary read-out or the final read-out includes the image signal level caused by the scattered radiation. Since the image signal level caused by the scattered radiation outside of the irradiation field on the stimulable phosphor sheet is often higher than the image signal level inside of the irradiation field, it is not always possible to discriminate between the image signal levels inside and outside of the irradiation field in the histogram obtained by the preliminary read-out. Therefore, in the case where Smax and Smin are calculated from the histogram as mentioned above and the read-out conditions for the final read-out and/or the image processing conditions are adjusted on the basis of Smax and Smin, the minimum image signal level inside of the irradiation field is not detected as Smin, and that caused by the scattered radiation outside of the irradiation field is detected as Smin. In general, the minimum image signal level outside of the irradiation field is lower than that inside of the irradiation field. Accordingly, when the minimum image signal level outside of the irradiation field is detected as Smin, signals caused by the scattered radiation not related to diagnosis are taken within a low density range in the final read-out and/or image processing, and the density of the image of the portion related to diagnosis becomes too high. As a result, the image contrast decreases and it becomes difficult to make an accurate diagnosis.

Namely, in the case where a radiation image is recorded by limiting the irradiation field, radiation scattered by the object passes outside of the irradiation field on the stimulable phosphor sheet, and noise caused by the scattered radiation (noise representing the unnecessary image information) is contained in the image signals obtained by the preliminary read-out and the final read-out. Therefore, when the read-out conditions for the final readout and/or the image processing conditions are adjusted based on such image signals, it is not always possible to adjust the read-out conditions for the final read-out and/or the image processing conditions to appropriate values and to obtain a visible image suitable for viewing, particularly for diagnostic purposes.

Therefore, in the case where the read-out conditions for the final read-out and/or the image processing conditions are to be adjusted based on the preliminary read-out image signals and/or the final read-out image. signals by use of the aforesaid method, the maximum image signal level Smax and the minimum image signal level Smin of a desired image information range should be calculated accurately by eliminating the adverse effects of the unnecessary image information such as the image information outside of the irradiation field, and the readout conditions for the final read-out and/or the image processing conditions should be adjusted on the basis of Smax and Smin thus calculated.

The aforesaid problems arise regardless of the kind of the recording medium on which the radiation image is to be recorded, i.e. regardless of whether the recording medium is the stimulable phosphor sheet or not.

SUMMARY OF THE INVENTION

The primary object of the present invention is to provide a method of adjusting read-out processing conditions for a radiation image, wherein the maximum image signal level Smax and the minimum image signal level Smin of a desired image information range are calculated accurately without being adversely affected by signals representing unnecessary image information which may be contained in image signals for condition adjustment, and read-out conditions for final read-out and/or image processing conditions are adjusted to appropriate values on the basis of Smax and Smin.

Another object of the present invention is to provide a method of adjusting read-out processing conditions for a radiation image, which is suitable for obtaining a visible reproduced image having an improved image quality, particularly a high diagnostic efficiency and accuracy.

The present invention provides a method of adjusting read-out processing conditions for a radiation image by calculating the maximum image signal level Smax and the minimum image signal level Smin of a desired image information range from image signals for condition adjustment which represent a radiation image, and adjusting the read-out processing conditions on the basis of the maximum image signal level Smax and the minimum image signal level Smin thus calculated, wherein the improvement comprises the steps of: determining at least one of said maximum image signal level Smax and said minimum image signal level Smin on the basis of a difference histogram of said image signals for condition adjustment.

The term "read-out processing conditions" as used herein means read-out conditions for final read-out and/or image processing conditions.

The term "image signals for condition adjustment" as used herein means the image signals which represent an objective radiation image and which are capable of being used for the adjustment of the read-out processing conditions. For example, in the case where the recording medium is a stimulable phosphor sheet, the preliminary readout image signals and/or the final read-out image signals may be used as the image signals for condition adjustment.

The term "difference histogram of image signals" as used herein typically means the histogram of the image signals at the picture elements where the absolute values of the differentiated values of the image signals are not smaller than a predetermined threshold value, and also embraces histograms obtained by modifying the histogram of the image signals at said picture elements in various manners.

The term "determining at least one of Smax and Smin on the basis of a difference histogram" as used herein means that at least one of Smax and Smin is determined by the utilization of the difference histogram. For example, the maximum image signal level and the minimum image signal level in the difference histogram may be taken as Smax and Smin. However, any other technique may be employed for this purpose, and Smax and/or Smin may be determined by utilizing the difference histogram and other information.

In the case where only one of Smax and Smin is determined on the basis of the difference histogram, the other of Smax and Smin may be determined by any method, and the method for this purpose is not limited to the method of determining on the basis of the ordinary image signals histogram as mentioned above.

The technique of adjusting the read-out processing conditions on the basis of Smax and Smin is not limited to the one wherein the read-out processing conditions are adjusted so that Smax and Smin correspond to Qmax, Qmin or Rmax, Rmin, and any other technique may be employed for this purpose.

Differentiation carried out in the course of generation of the difference histogram may be differentiation of first or higher order. In the case of a discretely sampled image, differentiation is equivalent to calculation of differences between image signals present in the vicinity. The term "presence in the vicinity" embraces not only the case where the image signals are present adjacent to each other but also the case where they are present alternately.

In general, in the case where a region where desired image information is recorded and a region where unnecessary image information is recorded are present in a single image, fluctuations in level among the image signals at picture elements present in the vicinity in the region where desired image information is recorded are large, and fluctuations in level among the image signals at picture elements present in the vicinity in the region where unnecessary image information is recorded are small. For example, in the case where an image of the chest of the human body is recorded by use of an irradiation field stop, fluctuations in image density are smaller, i.e. fluctuations in level among the image signals are smaller, in the unnecessary image information region such as a background region, where radiation directly impinges upon the recording medium without passing through the chest, and a region outside of the irradiation field than in the desired image information region where the image of the chest is recorded.

Therefore, when the image signals are differentiated, the differentiated values in the desired image information region become larger than the differentiated values in the unnecessary image information region. In the case where an appropriate threshold value is determined experimentally by considering the image recording portion of the object and/or the image recording method, the image signals in the desired image information region and the image signals in the unnecessary image information region can be discriminated from each other by investigating whether the absolute values of the differentiated values are larger or smaller than the threshold value.

Accordingly, when the difference histogram is generated by use of the appropriately adjusted threshold value, a difference histogram equivalent to or nearly equivalent to the histogram composed of only the image signals in the desired image information region can be obtained.

With the method of adjusting read-out processing conditions for a radiation image in accordance with the present invention, at least one of Smax and Smin is determined based on the difference histogram which is capable of being generated as the histogram of only the image signals in the desired image information region by use of the threshold value adjusted to an appropriate value. Therefore, it is possible to obtain Smax and Smin of the desired image information range more accurately than in the case where they are determined based on the ordinary image signal histogram as with the conventional technique. Accordingly, the read-out conditions for the final read-out and/or the image processing conditions can be adjusted to more appropriate values, and consequently a reproduced visible image suitable for viewing, particularly for diagnostic purposes, can be obtained.

DESCRIPTION OF THE PREFERRED EMBODIMENTS

The present invention will hereinbelow be described in further detail with reference to the accompanying drawings.

An embodiment of the method of adjusting read-out processing conditions for a radiation image in accordance with the present invention will be described hereinbelow by taking, as an example, the case where the present invention is applied to a radiation image recording and reproducing system using a stimulable phosphor sheet.

First, an embodiment wherein the read-out conditions for the final read-out are adjusted based on preliminary read-out image signals as the image signals for condition adjustment will be described hereinbelow.

The preliminary read-out image signals are first detected by carrying out the preliminary read-out as mentioned above from the stimulable phosphor sheet carrying a radiation image of a part of the human body as the object stored thereon. The radiation image of the object has been recorded on the stimulable phosphor sheet by use of an irradiation field stop.

Figure 1:
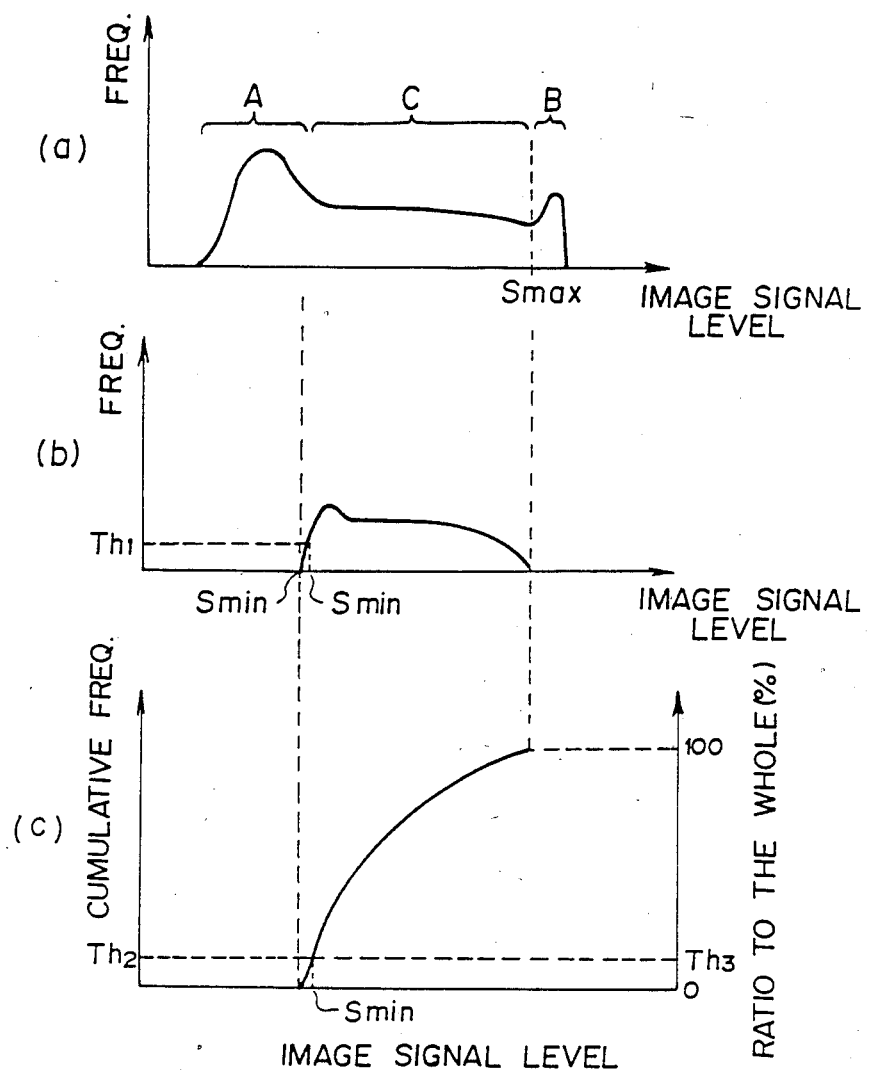
FIGS. 1 show graphs (a-c) respectively showing a histogram of image signals, a difference histogram of the image signals, and a cumulative histogram for the difference histogram shown in FIG. 1B.

A histogram of the preliminary read-out image signals thus detected is then generated. FIG. 1A shows an example of the histogram. In general, the histogram of the image signals has a characteristic pattern determined in accordance with the image recording portion of the object and/or the image recording method. Therefore, the desired image information region and the unnecessary image information region can be approximately discriminated from each other by studying the histogram by considering the image recording portion of the object and/or the image recording method. For example, in the histogram shown in FIG. 1A, it may be judged that the region A represents the image signals outside of the irradiation field, the region B represents the image signals at the background portion, and the region C represents the image signals in the desired image information region.

However, with the method of judging based on the aforesaid histogram, judgment can be made accurately to some extent in some cases and cannot be made accurately in other cases in accordance with the image recording portion of the object and/or the image recording method, or whether the irradiation field stop was used in the image recording step.

In this embodiment, the maximum image signal level of the desired image information range can be detected accurately to some extent. However, many image signals caused by the scattered radiation impinging upon the region outside of the irradiation field are present in the low level region and overlap the lower level side of the desired image information range, it is not always possible to detect the minimum image signal of the desired image information range accurately.

Accordingly, the maximum image signal level Smax alone of the desired image information range is first calculated from the histogram.

Figure 2:
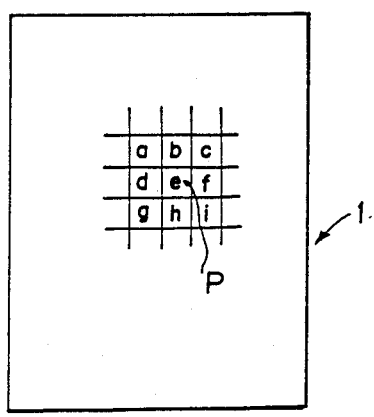
FIG. 2 is an explanatory view showing an example of differentiation processing of the image signals.

Then, differentiation processing of the aforesaid preliminary read-out image signals is carried out. Preprocessing such as smoothing may be carried out prior to differentiation processing. Differentiation processing may be effected in various manners, and may be effected by taking a remark picture element on a stimulable phosphor sheet 1 as P as shown in FIG. 2, and using such a differentiation operator that a differentiated value $\Delta p$ at the remark picture element P is expressed by $$\Delta p = |a + 2d + g - c - 2f - i|$$
$$+ |a + 2b + c - g - 2h - i|$$

where a to i represent the image signals at the picture elements around the remark picture element P.

After differentiation processing is finished, the differentiated values are compared with a predetermined threshold value, and a histogram (difference histogram) of only the preliminary read-out image signals at the picture elements whose differentiated values are not smaller than the predetermined threshold value is generated. The predetermined threshold value is used for discriminating between the differentiated values in the desired image information region and the differentiated values in the unnecessary image information region, and may be selected experimentally by considering the image recording portion of the object and/or the image recording method. FIG. 1B shows an example of the difference histogram generated in this manner.

The minimum image signal level Smin of the desired image information range is then calculated based on the difference histogram. As mentioned above, the difference histogram is generated as the histogram of only the image signals in the desired image information region by use of the threshold value adjusted to an appropriate value. Therefore, by use of the difference histogram, the desired image information range can be detected accurately and easily and, as a result, the minimum image signal level Smin of the desired image information range can be calculated accurately and easily. The minimum image signal level Smin may be calculated in various manners. In this embodiment, as shown in FIG. 1B, the minimum image signal level in the difference histogram is directly taken as Smin. However, as shown in FIG. 1B, a predetermined threshold value Th1 may be selected, and the image signal level at the point where the frequency exceeds the threshold value Th1 may be taken as Smin. Alternatively, as shown in FIG. 1C, a cumulative histogram for the difference histogram may be generated, and the image signal level at the point where the cumulative frequency exceeds a threshold value Th2 in the cumulative histogram or at the point where the ratio of the cumulative frequency to the whole exceeds a threshold value Th3 may be taken as Smin.

After the maximum image signal level Smax and the minimum image signal level Smin of the desired image information range are calculated in the manner as mentioned above, the read-out conditions for the final read-out are adjusted based on Smax and Smin. The adjustment of the read-out conditions for the final read-out based on Smax and Smin may be carried out in various manners. An example of the method for this purpose will hereinbelow be described with reference to FIG. 3.

Specifically, in the radiation image recording and reproducing system, electric image signals are generally obtained from the light emitted by the stimulable phosphor sheet in proportion to the stored radiation energy by use of the read-out conditions with the photoelectric read-out means as mentioned above, and are subjected to various signal processings in an image processing means, particularly the gradation processing which is carried out by use of the gradation processing conditions adjusted in accordance with the image recording portion of the object and/or the image recording method. The processed image signals are used to reproduce a visible image on a photographic film or the like by use of the image reproduction means. The reproduced visible image should have a correct density range suitable for viewing, particularly for diagnostic purposes. In general, the correct density range (Dmax to Dmin) is determined in advance. Also, image reproducing conditions in the image reproduction means (i.e. the conditions determining the relationship between the input to the image reproduction means and the output therefrom) are determined in advance in accordance with the kind of the image reproduction means used. Therefore, the range of signal levels (Rmax to Rmin) which should be sent to the image reproduction means as suitable for obtaining the correct density range (Dmax to Dmin) is determined by the image reproducing conditions. Also, the gradation processing conditions in the aforesaid image processing means are determined in advance in accordance with the image recording portion of the object and/or the image recording method, and therefore the input signal level range (Qmax to Qmin) in the image processing means corresponding to the range of signal levels (Rmax to Rmin) which should be sent to the image reproduction means is determined by the gradation processing conditions. Therefore, the range of the input signal levels (Qmax to Qmin) which should be sent to the image processing means as suitable for obtaining the correct density range (Dmax to Dmin) is determined by the gradation processing conditions and the image reproducing conditions determined in advance. Accordingly, the read-out conditions for the final read-out are adjusted so that the maximum image signal level Smax and the minimum image signal level Smin calculated in the manner as mentioned above correspond respectively to the maximum input signal level Qmax and the minimum input signal level Qmin determined in the manner as mentioned above.

Figure 3:
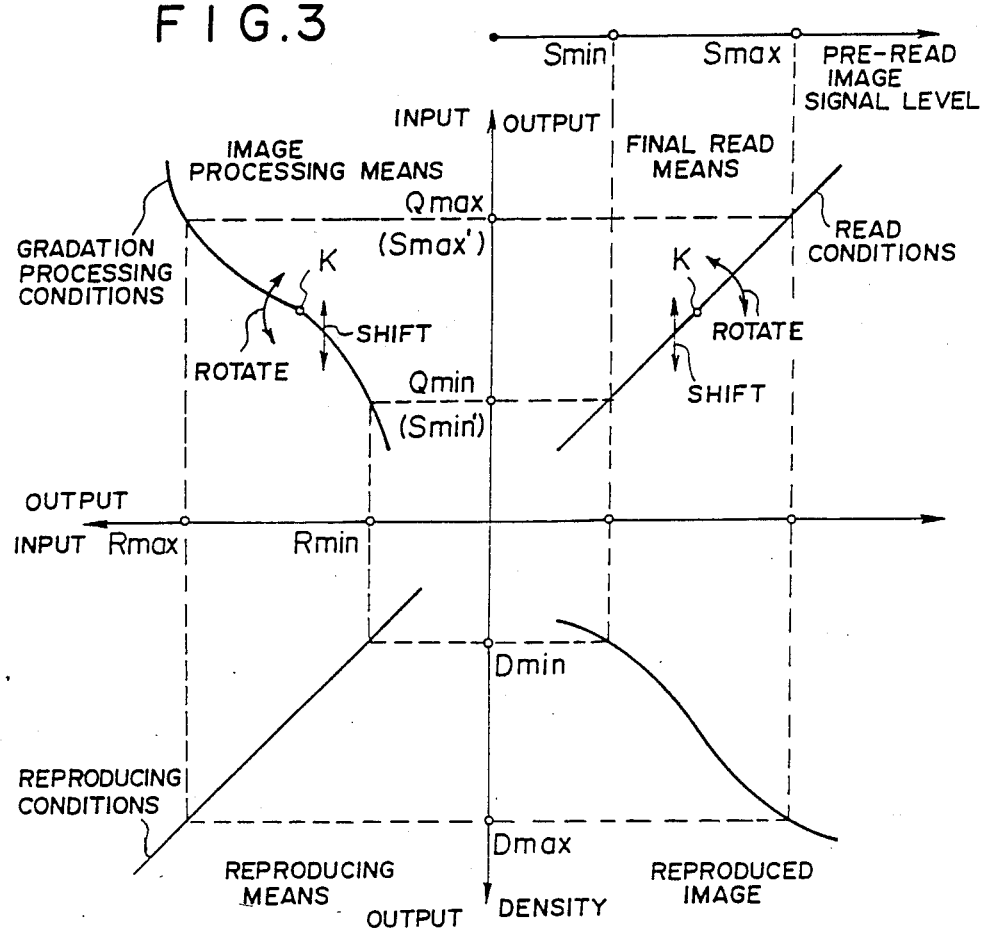
FIG. 3 is a graph showing the relationship between the image signals and the density of a reproduced visible image.

As mentioned above, the read-out conditions for the final read-out are adjusted so that Smax and Smin correspond to Qmax and Qmin. Specifically, the read-out conditions for the final read-out are adjusted so that the image signal levels (Smax to Smin) in the preliminary readout are detected as image signal levels (Qmax to Qmin) in the final read-out For example, as shown in FIG. 3, the read-out conditions for the final read-out may be adjusted by shifting the read-out conditions used in the course of the preliminary read-out or rotating them around a point k by considering the difference in the energy of stimulating rays between the preliminary read-out and the final read-out and other factors, so that Smax and Smin correspond respectively to Qmax and Qmin. Shifting of the read-out conditions as shown means that the read-out gain is changed, and rotation of the read-out conditions means that the scale factor is changed. The read-out conditions are not limited to the linear conditions as shown, but instead may be nonlinear.

An embodiment wherein the gradation processing conditions as one kind of the image processing conditions are adjusted based on Smax and Smin adjusted in the manner as mentioned above will hereinbelow be described with reference to FIG. 3. In this embodiment, the conditions of gradation processing of the final read-out image signals detected by carrying out the final read-out by use of the read-out conditions adjusted to appropriate values based on the image recording portion of the object and/or the image recording method, instead of on the basis of Smax and Smin are adjusted.

In this case, the read-out conditions for the final read-out have been adjusted, and therefore the image signal levels (Smax to Smin) in the preliminary read-out determined in the manner as mentioned above are detected as image signal levels (Smax' to Smin') in the final read-out. The image signal levels (Smax' to Smin') do not necessarily correspond to the input signal levels (Qmax to Qmin), and therefore the desired image information range cannot be expressed in the correct density range (Dmax to Dmin).

Accordingly, the gradation processing conditions are adjusted so that the maximum image signal level Smax and the minimum image signal level Smin of the desired image information range in the preliminary read-out image signals detected in the manner as mentioned above correspond respectively to the maximum signal level Rmax and the minimum signal level Rmin of the desired input signal range in the image reproduction means. Specifically, the final read-out image signals Smax' and Smin' respectively corresponding to the preliminary read-out image signals Smax and Smin are calculated by considering the read-out conditions for the preliminary read-out and the read-out conditions for the final read-out, and the gradation processing conditions are adjusted so that the levels (Smax' to Smin') are output as the levels (Rmax to Rmin) after image processing.

The gradation processing is carried out for converting the level of each image signal fed to an image processing means (a gradation processing means) by use of predetermined conditions. The predetermined conditions are referred to as the gradation processing conditions, and the gradation processing conditions are usually expressed by a non-linear gradation curve.

The purpose of the gradation processing is to obtain a visible reproduced image suitable for viewing, particularly for diagnostic purposes, in accordance with the image recording conditions, for example, the image recording portion of the object such as the head or the chest, and/or the image recording method such as plain image recording or contrasted image recording. Therefore, in general, basic patterns of non-linear gradation processing conditions most suitable for the respective image recording conditions should preferably be determined in advance, one of the basic patterns of the gradation processing conditions should be selected in accordance with the image recording conditions of an image in the course of gradation processing of the image, and the gradation processing should be carried out by use of the selected basic pattern.

Also in this embodiment, an appropriate basic pattern is selected from those of the gradation processing conditions predetermined in accordance with the image recording conditions of images. The gradation processing conditions which are to be used are adjusted by correcting the selected basic pattern, i.e. by, as shown in FIG. 3, vertically shifting the selected basic pattern or rotating it around a predetermined center point K so that Smax' and Smin' are output respectively as Rmax and Rmin.

Besides the non-linear gradation processing conditions determined by the image recording conditions as mentioned above, linear gradation processing conditions may be used in some cases. In such a case, the gradation processing conditions which are to be used are adjusted by rotating or shifting a single predetermined straight line in the manner as mentioned above so that Smax' and Smin' are output respectively as Rmax and Rmin. The adjustment of the gradation processing conditions by this method is carried out on the basis of only the maximum image signal level Smax and the minimum image signal level Smin of the desired image information range, instead of on the basis of the image recording portion of the object and/or the image recording method.

In an embodiment of the aforesaid radiation image recording and reproducing system, the final read-out is carried out directly without the preliminary read-out being carried out prior to the final read-out. In this case, the final read-out is carried out by use of the read-out conditions adjusted to appropriate values in accordance with the image recording portion of the object and/or the image recording method, and the gradation processing conditions are adjusted on the basis of the final read-out image signals. The method of adjusting read-out processing conditions for a radiation image in accordance with the present invention is also applicable to this case. Specifically, by way of example, in the same manner as the adjustment of the gradation processing conditions based on the preliminary read-out image signals, Smax may be calculated by generating the histogram of the final read-out image signals, Smin may be calculated by generating the difference histogram of the final read-out image signals, and the gradation processing conditions may be adjusted so that Smax and Smin correspond respectively to Rmax and Rmin.

In the aforesaid embodiment, the histogram of only the image signals at the picture elements where the absolute values of the differentiated values of the preliminary readout image signals or the final read-out image signals are not smaller than the predetermined threshold value is employed as the difference histogram. However, it is also possible to employ a histogram obtained by modifying the difference histogram, for example, a histogram which is composed of only the image signals at the picture elements where the signal levels are not lower than a predetermined threshold value, and which is obtained by weighting the frequency with the absolute values of the differentiated values.

Also, instead of calculating Smax from the ordinary histogram and calculating Smin from the difference histogram, Smin may be calculated from the ordinary histogram and Smax may be calculated from the difference histogram. Alternatively, both Smax and Smin may be calculated from the difference histogram. In the case where Smax is calculated from the difference histogram, the same technique as in the case where Smin is calculated from the difference histogram may be employed.

With the method of adjusting read-out processing conditions for a radiation image in accordance with the present invention wherein Smax and/or Smin is adjusted on the basis of the difference histogram in which the unnecessary image information is eliminated accurately, Smax and/or Smin can be calculated accurately. As a result, the read-out processing conditions can be adjusted to appropriate values.

It should be understood that the present invention can be modified in various manners within the scope thereof, and is not limited to the aforesaid embodiments.

I claim:

1. A method of adjusting read-out processing conditions for a radiation image by calculating the maximum image signal level Smax and the minimum image signal level Smin of a desired image information range from image signals for condition adjustment which represent a radiation image, and adjusting the read-out processing conditions on the basis of the maximum image signal level Smax and the minimum image signal level Smin thus calculated, wherein the improvement comprises the steps of:
obtaining image signals representing a radiation image, and applying differential processing to said image signals to obtain differentiated image signal values; and
making a histogram of said differentiated image signal values and determining at least one of said maximum image signal level Smax and said minimum image signal level Smin on a basis of said histogram.

2. A method as defined in claim 1 wherein the maximum image signal level in said histogram is directly taken as said maximum image signal level Smax, and/or the minimum image signal level in said histogram is directly taken as said minimum image signal level Smin.

3. A method as defined in claim 1, wherein a predetermined threshold value is selected in said histogram, and an image signal level at a point where the frequency exceeds said threshold value is taken as said maximum image signal level Smax or said minimum image signal level Smin.

4. A method as defined in claim 1 wherein a cumulative histogram for said histogram is generated, and an image signal level at a point where the cumulative frequency exceeds a threshold value in said cumulative historgram is taken as said maximum image signal level Smax or said minimum image signal level Smin.

5. A method as defined in claim 1 wherein a cumulative histogram for said histogram is generated, an an image signal level at a point where the ratio of the cumulative frequency to the whole exceeds a threshold value in said cumulative histogram is taken as said maximum image signal level Smax or said minimum image signal level Smin.

6. A method as defined in claim 1 wherein said read-out processing conditions are read-out conditions for the final read-out, and said read-out conditions for the final read-out are adjusted so that said maximum image signal level Smax and said minimum image signal level Smin correspond respectively to the maximum input signal level Qmax and the minimum input signal level Qmin in an image processing means which are determined by the maximum density Dmax and the minimum density Dmin of a correct density range in a reproduced visible image.

7. A method as defined in claim 1 wherein said read-out processing conditions are gradation processing conditions, and said gradation processing conditions are adjusted so that said maximum image signal level Smax and said minimum image signal level Smin correspond respectively to the maximum signal level Rmax and the minimum signal level Rmin of a desired input signal range in an image reproduction means which are determined by the maximum density Dmax and the minimum density Dmin of a correct density range in a reproduced visible image.

* * * * *